United States Patent
Scheibelhoffer et al.

(10) Patent No.: US 6,455,171 B2
(45) Date of Patent: Sep. 24, 2002

(54) MULTILAYER STRUCTURE WITH ACRYLIC CAP LAYER, POLYOLEFIN CORE LAYER, AND INTERMEDIATE TIE LAYER

(75) Inventors: Anthony S. Scheibelhoffer, Norton; Timothy W. Birch, Ravenna, both of OH (US)

(73) Assignee: Ferro Corporation, Cleveland, OH (US)

( * ) Notice: Subject to any disclaimer, the term of this patent is extended or adjusted under 35 U.S.C. 154(b) by 0 days.

(21) Appl. No.: 09/777,138

(22) Filed: Feb. 5, 2001

Related U.S. Application Data
(60) Provisional application No. 60/179,978, filed on Feb. 3, 2000.

(51) Int. Cl.$^7$ ................................................. B32B 27/30
(52) U.S. Cl. ........................ 428/517; 428/519; 428/520
(58) Field of Search ................................ 428/517, 519, 428/520

(56) References Cited

U.S. PATENT DOCUMENTS

| | | | |
|---|---|---|---|
| 5,055,346 A | * 10/1991 | Rohrbacher | .................. 428/216 |
| 5,264,280 A | 11/1993 | Chundury et al. | .......... 428/330 |
| 5,374,680 A | 12/1994 | Chundury et al. | ............. 525/71 |
| 5,385,781 A | 1/1995 | Chundury et al. | .......... 428/330 |

* cited by examiner

*Primary Examiner*—D. S. Nakarani
(74) *Attorney, Agent, or Firm*—Rankin, Hill, Porter & Clark LLP

(57) ABSTRACT

This invention relates to a multilayer thermoformable structure including: (A) a cap layer including at least 50% by weight of a polymethacrylate ester or polyacrylate ester or their copolymers or blends; (B) a core layer including at least 30% by weight polyolefin; and (C) a tie layer intermediate the cap layer (A) and core layer (B). The multilayer thermoformable structures of the invention are useful in applications requiring the physical properties of an olefin and the gloss, scratch resistance and chemical resistance of an acrylic polymer.

17 Claims, No Drawings

MULTILAYER STRUCTURE WITH ACRYLIC CAP LAYER, POLYOLEFIN CORE LAYER, AND INTERMEDIATE TIE LAYER

RELATED APPLICATIONS

This application claims the benefit of U.S. Provisional Application Serial No. 60/179,978, filed Feb. 3, 2000.

FIELD OF INVENTION

This invention relates to multilayer structures and polymer compositions for making the same. More particularly, the present invention concerns a multilayer structure having an acrylic polymer cap layer, polyolefin core layer, and an intermediate tie layer.

BACKGROUND OF THE INVENTION

Multilayered structures formed from blended polymers are useful in preparing parts for: the automotive industry; communications such as telephones, radio, TV, cassettes, etc.; power tools; appliances; business machines; toys; furniture; medical devices, etc. When preparing multilayer structures, the layers of the structures must adhere securely to each other. If the layers of the structure do not adhere to each other a special adhesive, or in other cases a tie layer, may be used to join the layers of the multilayer structure together.

Multilayer structures formed by blends of different polymer compositions are known in the prior art. Examples of such multilayer structures may be found, for example, in Chundury et al. U.S. Pat. Nos. 5,264,280, 5,374,680 and 5,385,781. Generally speaking, these patent references disclose multilayer structures comprising olefinic core layers and cap layers comprising polymers of vinyl aromatic compounds such as polystyrene.

The present invention provides a new and useful multilayer structure which provides the physical properties of an olefinic core layer and the glossy, scratch and chemical resistive properties of an acrylic cap layer. Furthermore, the acrylic cap layer serves to further enhance the thermoformability of the olefin or olefin blend cap layer.

SUMMARY OF THE INVENTION

The present invention provides a new and useful multilayer thermoformable structure comprising: (A) a cap layer comprising from 50% to about 100% by weight of a polymethacrylate ester, polyacrylate ester, their copolymers, or blends thereof; (B) a core layer comprising from 30% to about 100% by weight of a polyolefin; and (C) a tie layer intermediate the cap layer and core layer. The present invention also provides various ways in which to form the multilayer thermoformable structure.

In one preferred embodiment of the present invention, the tie layer (C) comprises a polymer composition selected from the group consisting of: (Ci) an olefin acrylate copolymer; (Cii) a block polymer of a vinyl aromatic monomer and an aliphatic conjugated diene, a selectively hydrogenated derivative thereof, or a selectively hydrogenated derivative thereof to which has been grafted an unsaturated carboxylic reagent; and blends of (Ci) and (Cii).

The multilayer structures of the present invention are useful in preparing thermoformed articles and are particularly useful in applications that require the thermoformability of an olefin and the gloss, scratch resistance and chemical resistance of an acrylic polymer. Applications for the multilayer structures of the present invention include, for example, automotive parts, plumbing fixtures and parts such as shower stalls, and appliance parts such as control panels, housings and lids, and medical applications.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION

Unless the context clearly indicates otherwise, as used in the instant specification and in the appended claims, the term "olefin-containing" or "olefinic" means that the material contains one or more thermoplastic polymers derived from olefin monomers. Olefin-containing materials can be homopolymers of olefin monomers, copolymers derived in part from olefin monomers, and polymer alloys that contain such olefinic homopolymers and/or copolymers alloyed with other polymers. Olefin-containing materials of this type are sometimes referred to herein as olefin alloys. As noted above, this application claims benefit of U.S. Provisional Application Serial No. 60/179,978, filed Feb. 3, 2000, which is hereby incorporated by reference in its entirety.

As noted above, the present invention provides a new and useful multilayer thermoformable structure comprising: (A) a cap layer of a polymer composition comprising 50% to about 100% by weight of a polymethacrylate ester or polyacrylate ester polymer or their copolymers or blends thereof; (B) a core layer comprising from about 30% to about 100% by weight of at least one polyolefin; and (C) a tie layer intermediate the cap layer and core layer. The tie layer (C), which is free of any solvents, is utilized to adhere the cap layer (A) to the core layer (B). The components of the multilayer thermoformable multilayer structure of the present invention, as well as the most preferred embodiments thereof, are separately discussed in greater detail below.

Cap Layer (A)

The cap layer (A) comprises from about 50% to about 100%, and preferably, from about 70% to about 100% by weight of a polymethacrylate ester or polyacrylate ester polymer or their copolymers or blends thereof. Preferably, the cap layer (A) comprises one or more acrylate copolymers formed from methyl methacrylate (MMA) monomer. It will be appreciated that various acrylate comonomers may be copolymerized with MMA to lower the glass transition temperature ($T_g$) of the acrylic polymer and thus confer some degree of flexibility to the formulated cap layer (A). Suitable acrylate comonomers are those, when polymerized into homopolymers, have a $T_g$ of less than about 373° K (i.e., about 100° C.), and which will readily copolymerize with MMA. Several examples of acrylate monomers that meet these requirements include, but are not limited to, those listed in Table 1 below:

TABLE 1

| Monomer | $T_g$ |
|---|---|
| Butyl Acrylate | 219° K. |
| Ethyl Acrylate | 218° K. |
| Heptyl Acrylate | 213° K. |
| 2-Heptyl Acrylate | 233° K. |

TABLE 1-continued

| Monomer | $T_g$ |
| --- | --- |
| Hexadecyl Acrylate | 308° K. |
| Hexyl Acrylate | 216° K. |
| Isobutyl Acrylate | 230° K. |
| Isopropyl Acrylate | 267–270° K. |
| 4-Methoxy Phenyl Acrylate | 198° K. |
| Nonyl Acrylate | 215° K. |
| Octyl Acrylate | 208° K. |
| Pentyl Acrylate | 216° K. |
| Phenyl Acrylate | 330° K. |
| Propyl Acrylate | 236° K. |

Many other acrylate comonomers having suitable $T_g$ values are listed in the *Polymer Handbook, 4th Edition*, J. Brandrup, E. H. Immergut, E. A. Grulke, Akihiro Abe, and D. Bloch, Editors (1999), pages 198–205, Section II, that portion of which is incorporated by reference herein.

In many applications where ultraviolet light or thermo/oxidative stability is required, it has been found that low $T_g$ methacrylate comonomers are preferred over acrylate comonomers. Several examples of suitable methacrylate comonomers include, but are not limited to, those listed in Table 2 below:

TABLE 2

| Monomer | $T_g$ |
| --- | --- |
| Butyl Methacrylate | 293° K. |
| Sec-Butyl Methacrylate | 333° K. |
| Cyclohexyl Methacrylate | 256° K. |
| Decyl Methacrylate | 203° K. |
| Dodecyl Methacrylate | 208° K. |
| 2Ethylhexyl Methacrylate | 263° K. |
| Ethyl Methacrylate | 338° K. |
| 2-Hydroxy Propyl Methacrylate | 311–359° K. |
| Isobutyl Methacrylate | 281–326° K. |
| Octyl Methacrylate | 308° K. |
| Octadecyl Methacrylate | 173° K. |
| Phenyl Methacrylate | 268° K. |

Other suitable methacrylate monomers are listed in the *Polymer Handbook, 4th Edition*, that portion of which was previously incorporated by reference above.

When used as comonomers in the copolymerization of MMA monomer, the comonomers identified in Tables 1 and 2, as well as those comonomers listed in the incorporated portion of the *Polymer Handbook, 4th Edition*, tend to lower the $T_g$ of the acrylic copolymer according to the following empirical equation:

$$1/T_{g(CP)} °K = W_{(CM\ A)}/T_{g(HP\ A)} °K + W_{(CM\ B)}/T_{g(HP\ B)} °K + \ldots$$

where:

$T_{g(CP)}$=the glass transition temperature of the copolymer in °K;

$W_{(CM\ A)}$=the weight fraction of comonomer A in the copolymer;

$T_{g(HP\ A)}$=the glass transition temperature of the homopolymer of comonomer A in °K;

$W_{(CM\ B)}$=the weight fraction of comonomer B in the compolymer; and $T_{g(HP\ B)}$=the glass transition temperature of the homopolymer of comonomer B in °K.

The above empirical equation can be used to adjust the $T_g$ of poly(methyl methacrylate) to a desired level. While the inclusion of low $T_g$ comonomers can confer desired flexibility upon the acrylic copolymer, they also reduce its hardness and thus reduce its mar or scratch resistance. Thus, in order to achieve a balance between flexibility and hardness (i.e., scratch resistance), it is preferable for the acrylic comonomer content to be less than about 40% by weight of the copolymer with MMA.

The presently most preferred comonomer is butyl methacrylate, which is preferably incorporated into poly (methyl methacrylate) copolymer in an amount of up to about 30% by weight.

Core Layer (B)

The core layer (B) comprises one or more polyolefins. The polyolefins employed in the semicrystalline or crystallizable olefin polymers including homopolymers, copolymers, terpolymers, or mixtures thereof, etc., containing one or more olefin monomeric units. The polyolefins are generally present in an amount from about 30%, or about 55%, or about 60% up to about 100% by weight.

Polymers of alpha-olefins or 1-olefins are preferred in the present invention, and these alpha-olefins may contain from 2 to about 20 carbon atoms. Alpha-olefins containing 2 to about 6 carbon atoms are preferred. Thus, the olefin polymers may be derived from olefins such as ethylene, propylene, 1-butene, 1-pentene, 4-methyl-1-pentene, 1-octene, 1-decene, 4-ethyl-1-hexene, etc. Examples of polyolefins include polypropylene, polyethylene, and ethylene propylene copolymers.

In one embodiment, the polyolefins include polypropylene and ethylene-propylene polymers. Propylene polymers may be semi-crystalline or crystalline in structure. The number average molecular weight of the propylene polymers is preferably above about 10,000 and more preferably above about 50,000. In addition, it is preferred in one embodiment that the apparent crystalline melting point be above about 75° C. and preferably between about 75° C. and about 250° C. The propylene polymers useful in preparing the polymer blends of the present invention are well-known to those skilled in the art and many are available commercially. Polypropylene are preferred propylene polymers, and polypropylenes such as Aristech F007S, Aristech F007F (homopolymers), and Union Carbide 7C06 or Exxon's PD7132 or Aristech's 4007F and 4040F (polypropylene-ethylene copolymers) are particularly preferred.

The propylene polymers preferably include at least one copolymer of propylene and ethylene. The propylene ethylene copolymer will generally contain from about 1%, or about 4% to about 10%, or about 7% by weight of ethylene. In one embodiment, the ethylene content is about 6% by weight. In one embodiment, the propylene ethylene copolymer is a random copolymer.

Processes useful in preparing the propylene ethylene copolymers useful in preparing the present invention are well-known to those skilled in the art and many such copolymers are available commercially. Such random copolymers may be prepared by any of a number of methods known in the art including those set forth in the *Encyclopedia of Polymer Science & Engineering*, Vol. 13, 2nd edition, Wiley & Sons, pp. 500-et seq. (and footnotes cited therein), which is fully incorporated by reference herein. Propylene ethylene copolymers useful in the present invention are available commercially. Examples of these copolymers include Atofina Y-8573 and Z-7650 available from Atofina, Dallas, Tex., U.S.A. and Soltex 4208 available from Soltex Polymer Corporation, Houston, Tex., U.S.A.

It will be appreciated that the core layer may also include other olefinic materials. For example, the core layer may include a polymer of a vinyl aromatic monomer and an unsaturated carboxylic reagent. Preferably, the unsaturated carboxylic reagent is a maleic reagent, such as maleic acid, imide, or anhydride. The core layer may also include a block polymer of a vinyl aromatic monomer and a conjugated diene, or a partially hydrogenated derivative thereof, or a selectively hydrogenated derivative thereof to which has been grafted a unsaturated carboxylic reagent. One such multiblock polymer is Stereon 841, available commercially from The Firestone Tire & Rubber Company. One particularly preferred core layer comprises a blend of from about 30% to about 70% by weight of an olefinic polymer or copolymer, from about 7% to about 65% by weight of an aromatic vinyl polymer or a copolymer thereof, and from about 5% to about 20% by weight of at least one block polymer of a vinyl aromatic monomer and an aliphatic conjugated diene, a selectively hydrogenated derivative thereof, or a selectively hydrogenated derivative thereof to which has been grafted a unsaturated carboxylic reagent or anhydride.

Tie Layer (C)

The tie layer (C) preferably comprises a polymer composition selected from the group consisting of: (Ci) an olefin acrylate copolymer; (Cii) a block polymer of a vinyl aromatic monomer and an aliphatic conjugated diene, a selectively hydrogenated derivative thereof, or a selectively hydrogenated derivative thereof to which has been grafted a unsaturated carboxylic reagent; and blends of (Ci) and (Cii).

In one embodiment, the tie layer is prepared from polymer compositions which are free of polyamides, e.g. nylon polymers. In another embodiment, the tie layer polymer compositions are free of polyurethane. In another embodiment, the tie layer polymer compositions are free of polyphenylene ether resins. In another embodiment, the tie layer is contains less than 30%, or about 20%, or about 10% by weight polyolefin, such as polymers of ethylene and polypropylene. In another embodiment, the tie layer is free of polyolefin.

Olefin Acrylate Copolymers (Ci)

In one preferred embodiment, the tie layer (C) comprises from about 5% to about 100% by weight of one or more olefin acrylate copolymers. The preferred olefin monomer in these copolymers is ethylene, and the preferred acrylate monomers in these copolymers is selected from the group consisting of methyl acrylate, ethyl acrylate, propyl acrylate, butyl acrylate, pentyl acrylate, and hexyl acrylate, with methyl acrylate and butyl acrylate being presently most preferred. Generally, the acrylate content of copolymers is from about 15% to about 30% by weight, with the balance being olefin.

Examples of suitable olefin acrylate copolymers include: Eastman Chemical Company olefin acrylic copolymer grades SP2255, SP2258, SP2205, SP2207, SP2220, SP2202, SP2260, SP1400, SP2268, SP1305, SP1307, SP1330, SP1802, and SP1903 (which are available as Ethyl Methyl Acrylate Copolymers (EMAC) or Ethyl Butyl Acrylate Copolymers (EBAC) containing various loadings of acrylate monomers); Elf Atochem Lotryl® olefin acrylic copolymer grades 17BA01, 17BG04, 17BA04, 17BA07, 28BA175, 30BA02, 35BA40, 35BA320 (which are Ethyl Butyl Acrylate (EBA) copolymers), and 9MA02, 14MG02, 15MA03, 16MA03, 18MA02, 18MG02, 20MA08, 24MA005, 28MA07, 28MA175, 29MA03, and 35MA05 (which are Ethyl Methyl Acrylate (EMA) copolymers); and Elf Atochem Lotader® olefin acrylic copolymer grades 2210, 3210, and 3410 (which are ethylene-n-butyl acrylate-maleic anhydride terpolymers), 6200, 8200, 3300, 2320, 7500, 5500, 4700, and 4720 (which are ethylene-ethyl acrylate-maleic anhydride terpolymers), and AX8840 (a copolymer of ethylene and glycidyl methacrylate), AX8900, AX8920, and AX8930 (which are terpolymers of ethylene-methyl acrylate-glycidyl methacrylate). These copolymers generally comprise a major portion by weight of an olefin monomer, usually ethylene, and a minor portion, typically up to about 30% by weight, of an acrylic monomer, usually methyl acrylate or butyl acrlate.

Block Polymers (Cii)

The tie layer (C) of the multilayered structures according to the invention can also comprise (Cii) a block polymer of a vinyl aromatic monomer and a conjugated diene, a partially hydrogenated derivative thereof, or a selectively hydrogenated derivative thereof to which has been grafted a unsaturated carboxylic reagent. The block polymer of a vinyl aromatic monomer and an aliphatic conjugated diene (Cii) is typically present in an amount from about 5%, or about 10%, or about 15% up to about 100% by weight of the polymer composition. In one embodiment, the block polymer (Cii) contains up to about 50% bound vinyl aromatic monomer. In another embodiment, the block polymer (Cii) contains greater than 60% by weight bound vinyl aromatic monomer. In yet another embodiment, the block polymer (Cii) comprises a blend of block polymers having less than about 50% by weight bound vinyl aromatic monomer and block polymers having greater than about 60% by weight bound vinyl aromatic monomer.

The block polymers, usually block copolymers, may be diblock, triblock, multiblock, starblock, polyblock or graftblock polymers. Throughout this specification and claims, the terms diblock, triblock, multiblock, polyblock, and graft or grafted-block with respect to the structural features of block polymers are to be given their normal meaning as defined in the literature such as in the *Encyclopedia of Polymer Science and Engineering*, Vol. 2, (1985) John Wiley & Sons, Inc., New York, pp. 325–326, and by J. E. McGrath in *Block Copolymers, Science Technology*, Dale J. Meier, Ed., Harwood Academic Publishers, 1979, at pages 1–5.

Such block polymers may contain various ratios of conjugated dienes to vinyl aromatic monomer. Accordingly, multiblock polymers may be utilized which are linear or radial symmetric or asymmetric and which have structures represented by the formulae A—B, A—B—A, A—B—A—B, B—A—B, $(AB)_{0,1,2}$ ... BA, etc., wherein A is a polymer block of a vinyl aromatic monomer or a conjugated diene/vinyl aromatic monomer tapered polymer block, and B is a polymer block of a conjugated diene.

The block polymers may be prepared by any of the well-known block polymerization or copolymerization procedures including sequential addition of monomer, incremental addition of monomer, or coupling techniques as illustrated in, for example, U.S. Pat. Nos. 3,251,905; 3,390,207; 3,598,887; and 4,219,627. As well-known, tapered polymer blocks can be incorporated in the multiblock copolymers by copolymerizing a mixture of conjugated diene and vinyl aromatic monomer monomers utilizing the difference in their copolymerization reactivity rates. Various patents describe the preparation of multiblock copolymers containing tapered copolymer blocks including U.S. Pat. Nos. 3,251,905; 3,639,521; and 4,208,356, the disclosures of which are hereby incorporated by reference.

Conjugated dienes which may be utilized to prepare the polymers and copolymers are those containing from 4 to about 10 carbon atoms and more generally, from 4 to 6 carbon atoms. Examples include from 1,3-butadiene, 2-methyl-1,3-butadiene (isoprene), 2,3-dimethyl-1,3-butadiene, chloroprene, 1,3-pentadiene, 1,3-hexadiene, etc. Mixtures of these conjugated dienes also may be used. The preferred conjugated dienes are isoprene and 1,3-butadiene.

The vinyl aromatic monomers which may be utilized to prepare the copolymers are described above. The preferred vinyl aromatic monomer is styrene.

Many of the above-described polymers of conjugated dienes and vinyl aromatic compounds are commercially available. The number average molecular weight of the block polymers, prior to hydrogenation, is from about 20,000 to about 500,000, preferably from about 40,000 to about 300,000.

The number average molecular weights of the individual blocks within the polymers may vary within certain limits. In most instances, the vinyl aromatic block will have a number average molecular weight in the order of about 2,000 to about 125,000, and preferably between about 4,000 and 60,000. The conjugated diene blocks either before or after hydrogenation will have number average molecular weights in the order of about 10,000 to about 450,000 and more preferably from about 35,000 to 150,000.

Also, prior to hydrogenation, the vinyl content of the block polymer is from about 10% to about 80%, and the vinyl content is preferably from about 25% to about 65%, particularly 35% to 55% when it is desired that the modified block polymer exhibit rubbery elasticity. The vinyl content of the block polymer can be measured by means of nuclear magnetic resonance.

Specific examples of diblock polymers include styrene-butadiene, styrene-isoprene, and the hydrogenated derivatives thereof. Examples of triblock polymers include styrene-butadiene-styrene, styrene-isoprene-styrene, alpha-methylstyrene—butadiene-alpha-methylstyrene, alpha-methylstyrene—isoprene-alpha-methylstyrene, and their partially hydrogenated derivatives. The diblock and triblock polymers are commercially available from a variety of sources under various trade names. An example of a commercially available diblock resin includes Solprene® 314D (Dynasol). A number of styrene-butadiene-styrene triblock polymers are sold by Kraton Polymers under the trademarks Kraton® 2103, Kraton® 2104, and Kraton® 2113. Such thermoplastic rubbery block polymers are made by anionic polymerization, and the above three identified Kraton Polymers differ in molecular weight and viscosity, and also in the ratio of butadiene to styrene. For example, Kraton® 2103 and Kraton® 2113 have a styrene to butadiene ratio of 28:72 while Kraton® 2104 as a styrene to butadiene ratio of 30:70. Blends of diblock and triblock polymers are also available. Kraton® 1118 is a blend of SB diblock and SBS triblock polymers. A particularly useful styrene-butadiene block copolymer is Kraton® G1701.

Multiblock polymers of styrene and either isoprene or butadiene also are commercially available. Commercially available and preferred styrene-butadiene multiblock polymers include Stereon® 841A (43% styrene:57% butadiene) and Stereon® 845A which are available from The Firestone Tire & Rubber Company.

Radial or starblock copolymers are available from Atofina under the general designation Finaprene SBS Polymer. A particularly useful radial or starblock polymer is available commercially under the designation Finaprene 602D.

The selective hydrogenation of the block polymers may be carried out by a variety of well-known processes including hydrogenation in the presence of such catalysts as Raney nickel, noble metals such as platinum, palladium, etc., and soluble transition metal catalysts. Suitable hydrogenation processes which can be used are those wherein the diene-containing polymer or polymer is dissolved in an inert hydrocarbon diluent such as cyclohexane and hydrogenated by reaction with hydrogen in the presence of a soluble hydrogenation catalyst. Such procedures are described in U.S. Pat. Nos. 3,113,986 and 4,226,952, the disclosures of which are incorporated herein by reference. Such hydrogenation of the block polymers which are carried out in a manner and to extent as to produce selectively hydrogenated polymers having a residual unsaturation content in the polydiene block from about 0.5 to about 20% of their original unsaturation content prior to hydrogenation.

In one embodiment, the conjugated diene portion of the block polymer is at least 90% saturated and more often at least 95% saturated while the vinyl aromatic portion is not significantly hydrogenated. Particularly useful hydrogenated block polymers are the hydrogenated block polymers of styrene-isoprene-styrene such as an (ethylene/propylene)-styrene block polymer. When a polystyrene-polybutadiene-polystyrene block polymer is hydrogenated, it is desirable that the 1,2-polybutadiene to 1,4-polybutadiene ratio in the polymer is from about 30:70 to about 70:30. When such a block polymer is hydrogenated, the resulting product resembles a regular polymer block of ethylene and 1-butene (EB). As noted above, when the conjugated diene employed as isoprene, the resulting hydrogenated product resembles a regular polymer block of ethylene and propylene (EP). One example of a commercially available selectively hydrogenated is Kraton G-1652 which is a hydrogenated SBS triblock comprising 30% styrene end blocks and a midblock equivalent is a polymer of ethylene and 1-butene (EB). This hydrogenated block polymer is often referred to as SEBS.

In another embodiment, the selectively hydrogenated block polymer is of the formula:

$$B_n(AB)_oA_p$$

wherein:

n=0 or 1;

o is 1 to 100;

p is 0 or 1;

each B prior to hydrogenation is predominantly a polymerized conjugated diene hydrocarbon block having a number average molecular weight of about 20,000 to about 450,000; and each A is predominantly a polymerized vinyl aromatic monomer block having a number average molecular weight of from about 2000 to about 115,000; the blocks of A constituting about 5% to about 95% by weight of the polymer; and the unsaturation of the block B is less than about 10% of the original unsaturation. In other embodiments, the unsaturation of block B is reduced upon hydrogenation to less than 5% of its original value, and the average unsaturation of the hydrogenated block polymer is reduced to less than 20% of its original value.

The block polymers of the vinyl aromatic monomer and the conjugated diene may also be grafted with one or more of the above described unsaturated monocarboxylic or dicarboxylic reagents. The carboxylic reagents include carboxylic acids per se and their functional derivatives such as anhydrides, imides, metal salts, esters, etc., which are capable of being grafted onto the selectively hydrogenated block polymer. The grafted polymer will usually contain from about 0.2 to about 20%, and preferably from about 0.1 to about 10% by weight based on the total weight of the block polymer and the carboxylic reagent of the grafted carboxylic acid.

In order to promote the grafting of the carboxylic acid reagent to the hydrogenated block polymer, free radical initiators are utilized, and these initiators usually are either peroxides or various organic azo compounds. The amount of initiator utilized generally is from about 0.01% to about 5% by weight based on the combined weight of the combined polymer and the carboxylic reagent. The amount of carboxylic acid reagent grafted onto the block polymers can be measured by determining the total acid number of the product. The grafting reaction can be carried out by melt or solution mixing of the block polymer and the carboxylic acid reagent in the presence of the free radical initiator.

The preparation of various selectively hydrogenated block polymers of conjugated dienes and vinyl aromatic monomers which have been grafted with a carboxylic acid reagent is described in a number of patents including U.S. Pat. Nos. 4,578,429; 4,657,970; and 4,795,782, and the disclosures of these patents relating to grafted selectively hydrogenated block polymers of conjugated dienes and vinyl aromatic compounds, and the preparation of such compounds are hereby incorporated by reference. U.S. Pat. No. 4,795,782 describes and gives examples of the preparation of the grafted block polymers by the solution process and the melt process. U.S. Pat. No. 4,578,429 contains an example of grafting of Kraton® G1652 (SEBS) polymer with maleic anhydride with 2,5-dimethyl-2,5-di(t-butylperoxy) hexane by a melt reaction in a twin screw extruder. (See Col. 8, lines 40–61.)

Examples of commercially available maleated selectively hydrogenated polymers of styrene and butadiene include Kraton® FG1901 from Kraton Polymers, often referred to as a maleated selectively hydrogenated SEBS polymer.

Examples of useful block polymers having greater than 60% by weight bound vinyl aromatic monomer include Phillips K-Resins® 03, 04 and 05. Generally, the K-Resins® have a high polystyrene content such as about 75%, and these resins are transparent and rigid. One particularly preferred block polymer is K-Resin® KR03. A similar material (75% styrene:25% butadiene) is available from Atofina under the designation Finaclear 520.

Examples of single component polymer compositions that can be used successfully as a tie layer include, for example, styrene-butadiene block copolymers (e.g., Stereon® 827, made by the Firestone Tire & Rubber Company, which comprises 27% styrene and 73% butadiene; Stereon® 841A, which comprises 44% styrene and 56% butadiene; and Atofina 602D, which comprises 40% styrene and 60% butadiene), styrene-butadiene-ethylene/butene block copolymers (e.g., Kraton® G1652, which comprises 29% styrene and 71% ethylene/butylene; and Kraton® FG1901, which has the same composition as Kraton® G1652 except that it also includes 2% maleic anhydride graft), methyl acrylate-ethylene copolymers (e.g., Eastman DS1186-70, which comprises 40% methyl acrylate and 60% ethylene; and Lotador® AX8660, which comprises 24% ethyl acrylate, 8% glycidyl methacrylate, and 68% ethylene; and Eastman DS1185, which comprises 30% methyl acrylate and 70% ethylene).

Fillers and Other Additives

The above polymer layers may contain one or more fillers or fibers, or other additives of the type used in the polymer art. Examples of additives include, for example, UV light inhibitors or stabilizers, lubricant agents, heat stabilizers, flame retardants, synergists, pigments and other coloring agents. Examples of fillers employed in a typical compounded polymer blend according to the present invention include talc, calcium carbonate, mica, wollastonite, dolomite, glass fibers, boron fibers, carbon fibers, carbon blacks, pigments such as titanium dioxide, or mixtures thereof. Preferred fillers are a commercially available talc such as Lazenac, Inc.'s Select-A-Sorb®, Jet Fil® and glass fibers. The amount of filler and additives included in the blended polymers may vary from about 1% to about 70% of the combined weight of polymer, additives and filler. Generally amounts from about 5% to about 45%, from about 30% to about 40%, are included.

The fillers may be treated with coupling agents to improve the bond between the fillers to the resin. For example, the fillers can be treated with materials such as fatty acids (e.g., stearic acid), silanes, maleated polypropylene, etc. The amount of coupling agent used is an amount effective to improve the bond between the fillers with the resin.

Preparation of Polymer Blends

The blended polymer compositions of the present invention can be prepared by techniques well-known to those skilled in the art. For example, a particularly useful procedure is to intimately mix the polymers using conventional melt mixing equipment such as a mill, a Busse, a Banbury, a Brabender, a Haake Torque Rheometer, a single or twin screw extruder, continuous mixers, kneaders, etc. For example, the polymers may be intimately mixed in the form of granules and/or powder in a high shear mixer. One preferred process for preparing the blended polymers utilizes the Farrell Compact Processor, CP-23 and CP-57. Short residence times and high shear are readily obtained in a CP-23 and a CP-57. "Intimate" mixing means that the mixture is prepared with sufficient mechanical shear and thermal energy to produce a dispersed phase which is finely divided and homogeneously dispersed in the continuous or principal phase.

The cap, core, and tie layers can be adhered to each other by well-known methods such as co-extrusion and lamination. Thermoformed articles having desired shapes can be produced from the multilayer structures of the present invention by:

(A) feeding a sheet of the multilayer structure of the invention to a heating station;

(B) heating the sheet to its softening point; and (C) feeding the softened sheet to a forming station where it is thermoformed into articles of the desired shape.

Various features and aspects of the present invention are illustrated further in the examples that follow. While these examples are presented to show one skilled in the art how to operate within the scope of this invention, they are not to serve as a limitation on the scope of the invention where such scope is only defined in the claims. Moreover, in the following examples, preparation of blends, compounds, injection molded specimens, mono layer or laminated sheets are illustrated. These examples serve merely as illustrative embodiments of the present invention and are not to be considered limiting.

Unless otherwise indicated in the following examples and elsewhere in the specification and claims, all parts and percentages are by weight, temperatures are in degrees centigrade and pressures are at or near atmospheric. Unless the context indicates otherwise, throughout the specification and claims, the amount of the polymers present is determined exclusive of filler or other non-polymer additive in the polymer compositions. Therefore the amount of each polymer is determined by dividing the weight of the polymer by the combined weight of all polymers present in the composition.

EXAMPLES 1–8

Multilayer thermoformable composite structures 1–8 were made by separately extruding a cap layer (A), a core layer (B), and an intermediate tie layer (C) using the resins noted in Table 3 below. The three film layers were extruded to a co-extrusion feed block where the layers were brought together and then made to flow through a sheet die. The co-extruded sheets were then passed between a series of polish rolls which both cooled and imparted a surface to the sheets. After the multilayer thermoformable composite structures cooled to ambient temperature (about 25° C.), it was not possible to pull the cap layer (A) from the core layer (B) (i.e., delaminate the multilayer structure). Adhesion strength estimates between the tie layer (C) and the cap layer (A) and core layer (B) are shown in Table 3 below (where E=Excellent, VG=Very Good, and G=Good, and + sign indicates better adhesion):

TABLE 3

| Example | Cap Layer (A) | Core Layer (B) | Tie Layer (C) | Adhesion of (C) to (A) | Adhesion of (C) to (B) |
|---|---|---|---|---|---|
| 1 | Korad ® | Optum ® | Stereon ® 827 | E+ | E+ |
| 2 | Korad ® | Optum ® | Stereon ® 841A | E+ | E+ |
| 3 | Korad ® | Optum ® | Kraton ® G1652 | E | E+ |
| 4 | Korad ® | Optum ® | Kraton ® G1901 | VG+ | E+ |
| 5 | Korad ® | Optum ® | Eastman DS-1186-70 | VG+ | E |
| 6 | Korad ® | Optum ® | Atofina 602D | VG+ | E |
| 7 | Korad ® | Optum ® | Lotader ® AX8660 | G | E |
| 8 | Korad ® | Optum ® | Eastman-1185 | G | E |

Korad® is an acrylic polymer manufactured by Polymer Extruded Products, Inc.
Optum® is a polypropylene-styrene alloy manufactured by Ferro Corporation.

EXAMPLE 9

The multilayer composite structures from Examples 1–8 were placed in standard vacuum forming equipment. The sheets were heated until the sheet sagged about 6 mm to about 13 mm. The mold was closed to form a thermoformed article.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed:

1. A multilayer thermoformable structure comprising:
   a layer (A) comprising from 50% to about 100% by weight of a polymethacrylate ester or polyacrylate ester or their copolymers or blends thereof;
   a layer (B) comprising from 30% to about 100% by weight of a polyolefin; and
   a tie layer (C) intermediate said layer (A) and said layer (B), said tie layer (C) comprising:
   (Ci) an olefin acrylate copolymer; or
   (Cii) a block polymer of a vinyl aromatic monomer and an aliphatic conjugated diene, a selectively hydrogenated derivative thereof, or a selectively hydrogenated derivative thereof to which has been grafted an unsaturated carboxylic reagent.

2. The multilayer thermoformable structure of claim 1 wherein said tie layer (C) comprises a blend of (Ci) and (Cii).

3. The multilayer thermoformable structure of claim 1 wherein said layer (B) comprises polypropylene.

4. The multilayer thermoformable structure of claim 3 wherein said polypropylene has a number average molecular weight greater than about 10,000 and a crystalline melting point above about 75° C.

5. The multilayer thermoformable structure of claim 4 wherein said polypropylene has a number average molecular weight greater than about 50,000 and a crystalline melting point between about 75° C. and about 250° C.

6. The multilayer thermoformable structure of claim 1 wherein said layer (B) comprises a propylene ethylene copolymer.

7. The multilayer thermoformable structure of claim 6 wherein said propylene ethylene copolymer comprises from about 1% to about 10% by weight of ethylene.

8. The multilayer thermoformable structure of claim 7 wherein said propylene ethylene copolymer comprises from about 4% to about 7% by weight of ethylene.

9. The multilayer thermoformable structure of claim 1 wherein said olefin acrylate copolymer comprises an olefin monomer copolymerized with an acrylate monomer selected from the group consisting of methyl acrylate, ethyl acrylate, propyl acrylate, butyl acrylate, pentyl acrylate, and hexyl acrylate.

10. The multilayer thermoformable composite structure of claim 9 wherein the acrylate content of said olefin acrylate copolymer is from about 15% to about 30% by weight.

11. A multilayer thermoformable composite structure comprising:
   a layer (A) comprising a copolymer of methyl methacrylate (MMA) monomer and a comonomer that when polymerized into a homopolymer has a $T_g$ of less than about 373° K;
   a layer (B) comprising an olefin selected from the group consisting of polypropylene, polyethylene, ethylene propylene copolymers, and alloys thereof; and
   a tie layer (C) intermediate said layer (A) and said layer (B), said tie layer comprising:

(Ci) an olefin acrylate copolymer, or (Cii) a block polymer of a vinyl aromatic monomer and an aliphatic conjugated diene, a selectively hydrogenated derivative thereof, or a selectively hydrogenated derivative thereof to which has been grafted an unsaturated carboxylic reagent.

12. The multilayer thermoformable composite structure of claim 11 wherein said layer (B) comprises a polypropylene alloy.

13. A multilayer thermoformable structure comprising:

a layer (A) comprising from 50% to about 100% by weight of a polymethacrylate ester or polyacrylate ester or their copolymers or blends thereof;

a layer (B) comprising a blend of from about 30% to about 70% by weight of an olefinic polymer or copolymer, from about 7% to about 65% by weight of an aromatic vinyl polymer or a copolymer thereof, and from about 5% to about 20% by weight of at least one block polymer of a vinyl aromatic monomer and an aliphatic conjugated diene, a selectively hydrogenated derivative thereof, or a selectively hydrogenated derivative thereof to which has been grafted a unsaturated carboxylic reagent or anhydride; and a tie layer (C) intermediate said layer (A) and said layer (B).

14. The multilayer thermoformable composite structure of claim 13 wherein said olefinic polymer or copolymer of said layer (B) comprises polypropylene or its copolymers.

15. The multilayer thermoformable composite structure of claim 14 wherein said aromatic vinyl polymer or a copolymer thereof of said layer (B) comprises polystyrene and/or styrene-maleic anhydride copolymer.

16. The multilayer thermoformable composite structure of claim 15 wherein said block polymer comprises blocks of styrene and butadiene.

17. The multilayer thermoformable composite structure of claim 16 wherein layer (A), layer (B), and/or tie layer (C) further comprise up to about 50% by weight of at least one filler.

* * * * *